United States Patent Office 3,492,364
Patented Jan. 27, 1970

3,492,364
PROCESS FOR PREPARING DETERGENT
ALKYLATE
William A. Jones and Roger F. Kleinschmidt, Bartlesville, Okla., assignors to Phillips Petroleum Company, a corporation of Delaware
No Drawing. Filed Feb. 8, 1966, Ser. No. 525,859
Int. Cl. C07c 3/50
U.S. Cl. 260—671                                    2 Claims

ABSTRACT OF THE DISCLOSURE

Olefins in the $C_4$–$C_8$ range which are present in a mixture are dimerized by separating the mixture into $C_4$–$C_6$ and $C_6$–$C_8$ fractions, dimerizing each fraction separately, separating and recycling unreacted olefin, and alkylating an aromatic hydrocarbon with said dimerized products to produce detergent alkylate useful in preparing biodegradable detergent. The resultant products obtained from the dimerization zones can be blended to produce a product mixture of desired characteristics and problems of monomer separation from the dimers are minimized.

---

This invention relates to dimerization of olefins. In one aspect, it relates to an improved method for dimerization of olefins by splitting the olefin feed stream into a plurality of fractions, and dimerizing each fraction separately. In another aspect, it relates to the production of a dimerized product mixture of controlled properties from an olefin feed stream by dimerizing various fractions of the feed stream individually, and blending the dimerized products to form a product mixture of desired characteristics. In another aspect, it relates to a more efficient method of dimerizing a mixture of olefins by splitting the mixture of olefins into a plurality of fractions and dimerizing each fraction separately, whereby difficult-to-separate monomers and dimers of approximately equal carbon numbers do not occur in the same fraction. In another aspect, it relates to an improved method of dimerizing a mixture of $C_4$ to $C_8$ olefins comprising splitting the olefin mixture into a fraction of $C_4$ to $C_6$ olefins, and another fraction of $C_6$ to $C_8$ olefins, and dimerizing the two fractions individually.

Most of the methods for production of alpha-olefins produce a product mixture having a broad range of $C_4$ to $C_{20}$ olefins. Although the higher olefins find ready use in a number of applications, there is somewhat limited use of olefins in the $C_4$ to $C_8$ range. It has been proposed that straight chain olefins within this range could conveniently be dimerized in the presence of aluminum alkyls to produce singly branched $C_8$ to $C_{16}$ olefins suitable for use in the preparation of biodegradable detergents.

In attempting to dimerize such compounds, two problems arise which seriously affect the economic utilization of the dimerization reactions in the production of biodegradable detergents. First, composition of the dimer product produced is solely a function of the concentrations of the various monomers present in the dimerization, and little or no control over the product can be exercised by changing reaction conditions. Thus, a dimer product having the desired proportion of various dimers is difficult to obtain, when there are variations of the monomer feed stream. Secondly, the singly branched dimer of $C_4$ hydrocarbons is quite difficult to separate from the unreacted and unbranched $C_8$ monomer, thus making it impossible to remove and recycle the unreacted $C_8$ momomer, to a fresh dimerization reaction. Since the rate of dimerization diminishes as the reaction progresses, it is economically important that provision be made for recycling unreacted olefins after an optimum reaction time, rather than permitting the reaction to proceed to completion. In dimerizing a mixture of $C_4$ to $C_8$ monomers, therefore, the alternatives are to accept a product stream having some unreacted $C_8$ olefin present, and allowing the reaction to continue until completion in an uneconomic manner.

Both of these problems are solved by the process of our invention. It is an object of our invention to produce dimer product mixtures of controled composition. It is another object of our invention to allow ready recycle of unreacted monomers in a dimerization reaction.

Other aspects, objects and the several advantages of this invention are apparent to one skilled in the art from a study of this disclosure, and the appended claims.

According to the invention, the above objects are obtained by separating the mixture of olefin monomers into a plurality of fractions, and dimerizing each fraction separately. Dimerized fractions can then be blended as desired to produce a dimer mixture of desired characteristics. By choosing the fractions so that a monomer and a dimer of equal carbon numbers will never be present in the same fraction, the problem of separation of the two is avoided, and the unreacted monomer may readily be removed by fractionation from the dimer and recycled to further dimerization.

In the preparation of olefins suitable for use in synthesizing biodegradable detergents, an olefin mixture comprising $C_4$ to $C_8$ predominantly straight chain alpha-olefins is dimerized in the presence of a catalyst of trialkylaluminum or dialkyluminum hydride by first separating this mixture into one fraction containing $C_4$ to $C_6$ alpha-olefins, and a second fraction containing $C_6$ to $C_8$ alpha-olefins. The two fractions are dimerized separately, the first fraction yielding a dimerization product comprising $C_8$ to $C_{12}$ olefins, and the second fraction yielding a product comprising $C_{12}$ to $C_{16}$ olefins. The dimerization products consist predominantly of singly branched 1-olefins, with the branching adjacent to the olefinic double bond.

After separation of unreacted alpha-olefins and of solvent, if used, from each of the reaction mixtures, and after distillation of the $C_8$ and $C_9$ predominantly branched olefins from the higher boiling components of the mixture containing the $C_8$ to $C_{12}$ dimerization product, the remaining dimerization products are distilled to give a $C_{10}$ to $C_{12}$ olefin mixture and a $C_{12}$ to $C_{16}$ olefin mixture. The residues remaining from these distillations, which can be carried out, e.g., at temperatures up to about 125° C./1 mm., consist primarily of essentially non-volatile aluminum alkyls which are recycled for use in the process. Similarly, the unreacted alpha-olefins are recycled in the process, as is the solvent, if a solvent is employed. The $C_8$ and $C_9$ predominantly branched olefin products are employed as intermediates in the preparation of special products. The $C_{10}$ to $C_{12}$ and $C_{12}$ to $C_{16}$ predominantly branched olefin products can be combined, in the desired proportion, and used in the alkylation of an aromatic hydrocarbon to produce a detergent alkylate. In some instances it is advantageous to distill the $C_{10}$ to $C_{12}$ and $C_{12}$ to $C_{16}$ olefin products, separately or combined, to obtain a particular olefin fraction for use in the alkylation of the aromatic hydrocarbon. Alternatively, the $C_{10}$ to $C_{12}$ and $C_{12}$ to $C_{16}$ olefin products can be employed in two separate alkylations, the two alkylates then being combined in the desired proportion. If desired, the two alkylates can be sulfonated prior to being combined in the desired proportion.

As stated above, the various fractions can be blended after dimerization to form a dimerized product mixture of any desired concentration. This is an improvement over the old process of using a single mixture of olefins for dimerization whereby the composition of the product mixture could not be controlled except by changing the concentration of the initial reactants. For example, the dimerization of a single mixture of $C_4$ to $C_8$ olefins gives a mixture of $C_8$ to $C_{16}$ olefins, the amount of each of which is dependent on the relative concentrations of reacting olefins. Each of the olefins within this range is of approximately the same reactivity, and the dimerization process, therefore, will yield not only true dimers, but also "mixed dimers"; e.g., decenes result from the reaction of 1-butene with 1-hexene, and tetra-decenes are formed by the reaction of 1-hexene with 1-octene. The relative amounts of dimerization products from a given olefin feed cannot be changed substantially from a predictable statistical distribution. Although there is also a statistical distribution of products formed in the separate dimerization of $C_4$ to $C_6$ olefin fraction and a $C_6$ to $C_8$ olefin fraction, greater flexibility and control of the average length of the alkyl group on the detergent molecule can be achieved by combining the dimerized olefins from the separate dimerizations, or by combining the detergent alkylate or detergent therefrom, in the desired proportions.

The process of the invention can be better seen upon reference to the following block flow diagram:

Dimerization of the $C_4$ to $C_6$ and $C_6$ to $C_8$ alpha-olefins is carried out through use of a trialkylaluminum or dialkylaluminum hydride, e.g., dimethylaluminum hydride, triethylaluminum, triisobutylaluminum, diisobutylaluminum hydride, dihexylaluminum hydride, trioctylaluminum, and the like. Preferably each of the alkyl groups in these catalysts contains 1 to 8 carbon atoms. When displacement of the alkyl groups from the catalyst gives reactive alpha-olefins other than those present in the olefin feed, the alpha-olefins thus produced enter dimerization and "mixed dimerization" reactions to give minor amounts of products other than those formed from the olefin feed. However, this displacement to give contaminating olefins would be significant only during the initial phase of the dimerization. The amount of catalyst used is preferably within the range of about 0.2–10 mole percent, more desirably within the range of about 0.5 to 5 mole percent, of the olefins employed. If desired, an inert solvent can be used. Suitable solvents include acyclic or cyclic paraffins such as pentane, hexane, heptane, cyclopentane, cyclohexane, and the like, as well as aromatic solvents such as benzene and toluene.

The dimerization reaction is preferably carried out at temperatures within the range of about 110–300° C.,

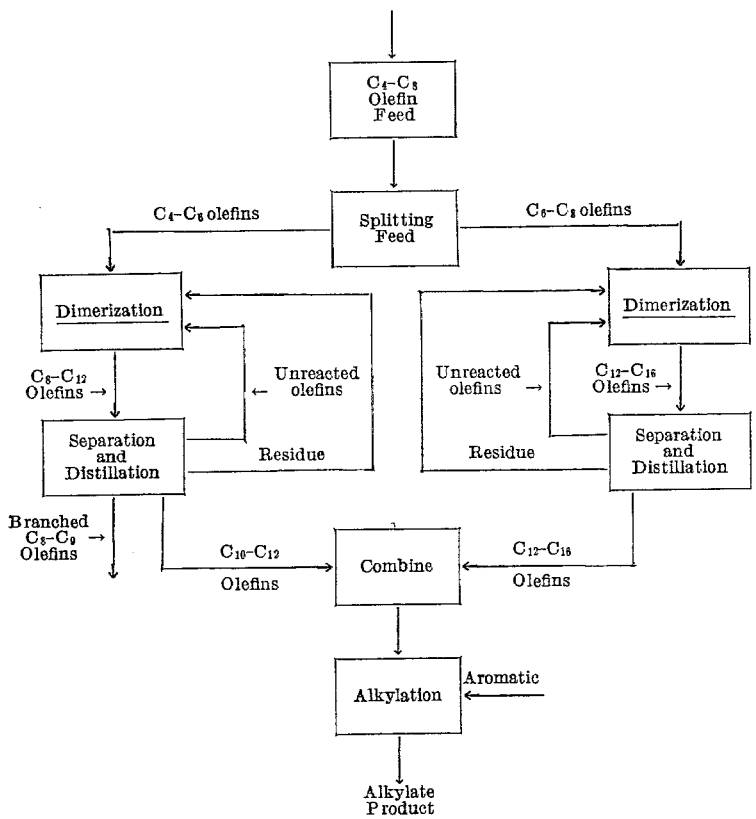

The $C_4$ to $C_6$ and $C_6$ to $C_8$ alpha-olefins applicable in the process of this invention are preferably predominantly olefins which contain no branching. Such olefins can be obtained from commercial processes, e.g., from steam cracking of wax, petrolatum, or paraffinic gas oil. A particularly good source of these alpha-olefins is the ethylene growth process carried out in the presence of aluminum alkyls. In this process ethylene is polymerized to alpha-olefins containing 4 to 20 or more carbon atoms. The lower olefins are especially suitable for use in the process of this invention. When convenient and desirable, the ratio of homologs within the $C_4$ to $C_6$ fraction, and the ratio of homologs within the $C_6$ to $C_8$ fraction, can be varied.

more desirably at temperatures within the range of about 160–250° C. The reaction time will ordinarily fall within the range of about 30 minutes to about 20 hours, generally being within the range of about 1 hour to about 10 hours. The pressure at which the reaction can be carried out can range from about atmospheric pressure to about 200 atmospheres, pressures within the range of about 5–100 atmospheres being preferred. Preferably the reaction is carried out in a liquid phase.

Alkylation of benzene or other aromatic hydrocarbons with the olefins produced by the dimerization of the $C_4$ to $C_6$ olefins and the $C_6$ to $C_8$ olefins can be caried out by methods well known in the art using a Friedel-Crafts cataylst such as hydrogen fluoride, aluminum chloride, boron fluoride, and the like. Similarly, sulfonation of the resulting alkylate can be effected by standard procedures using sulfuric acid, oleum, sulfur trioxide, chlorosulfonic acid, and the like. The resulting sulfonate can then be neutralized to give the desired biodegradable detergent.

EXAMPLE I

A stirred mixture of 27.2 g. (0.485 mole) of 1-butene, 50.5 g. (0.45 mole) of 1-octene, 6.4 g. (0.0227 mole) of trihexylaluminum, and 54 g. of heptane was heated at 200° C. for 6 hours in a 300-ml. autoclave. During this period of heating the pressure dropped from 330 p.s.i.g. to 240 p.s.i.g. Gas chromatographic analysis of the reaction mixture showed the conversion of 1-butene and 1-octene to be 81.5 and 75.9 percent, respectively. The analysis showed $C_8$, $C_{12}$, and $C_{16}$ olefins were produced in amounts of 0.1112, 0.1559, and 0.0850 mole, respectively. Thus, there were produced 31.6, 44.3, and 24.1 moles of $C_8$, $C_{12}$, and $C_{16}$ olefins, respectively, per 100 moles of total $C_8$, $C_{12}$, and $C_{16}$ olefins produced. On the assumption that 1-butene and 1-octene are equally reactive, the calculated amounts would be 26.9, 49.9, and 23.2 moles of $C_8$, $C_{12}$, and $C_{16}$ olefins, respectively, per 100 moles of total $C_8$, $C_{12}$, and $C_{16}$ olefins produced. A comparison of the 1-butene and 1-octene conversions, and a comparison of the observed and calculated ratios of the amounts of $C_8$, $C_{12}$, and $C_{16}$ olefins produced, indicate that the olefins are of substantially the same reactivity, being formed in amounts following a predictable statistical distribution. Minor amounts of dimers and "mixed dimers" resulted from reactions of 1-hexene derived from the catalyst.

EXAMPLE II

Another run was carried out similarly except that the ratio of 1-butene to 1-octene was nearly 2:1 and a lower temperature was employed. A stirred mixture of 183 g. (3.26 moles) of 1-butene, 168 g. (1.50 moles) of 1-octene, 21.5 g. (0.0761 mole) of trihexylaluminum, and 65.5 g. of heptane was heated at 175° C. for 6 hours in a 1-liter autoclave. During this period of heating the pressure dropped from 360 p.s.i.g. to 174 p.s.i.g. Gas chromatographic analysis of the reaction mixture showed the conversion of 1-butene and 1-octene to be 57.0 and 52.0 percent, respectively. The analysis showed $C_8$, $C_{12}$, and $C_{16}$ olefins were produced in amounts of 0.617, 0.532, and 0.108 mole, respectively. Thus, there were produced 49.1, 42.3, and 8.6 moles of $C_8$, $C_{12}$, and $C_{16}$ olefins, respectively, per 100 moles of total $C_8$, $C_{12}$, and $C_{16}$ olefins produced. On the assumption 1-butene and 1-octene are equally reactive, the calculated amounts would be 44.1, 38.1, and 7.8 moles of $C_8$, $C_{12}$, and $C_{16}$ olefins, respectively, per 100 moles of total $C_8$, $C_{12}$, and $C_{16}$ olefins produced. Again, a comparison of the 1-butene and 1-octene conversions, and a comparison of the observed and calculated ratios of the amounts of $C_8$, $C_{12}$, and $C_{16}$ olefins produced, indicate that the olefins are of substantially the same reactivity, and are formed in amounts following a predictable statistical distribution. As in Example I, minor amounts of dimers and "mixed dimers" resulted from reactions of 1-hexene derived from the catalyst.

EXAMPLE III

A stirred mixture of 673 g. (12.0 moles) of 1-butene, 505 g. (6.0 moles) of 1-hexene, 25.5 g. (0.224 mole) of triethylaluminum, and 76.5 g. of cyclohexane was heated at 200° C. for 6½ hours in a 1-gallon autoclave. During this period of heating the pressure dropped from 585 p.s.i.g. to 215 p.s.i.g. Gas chromatographic analysis of the reaction mixture showed the conversion of 1-butene and 1-hexene to be 75.5 and 64.9 percent, respectively. The analysis showed $C_8$, $C_{10}$, and $C_{12}$ olefins were produced in amounts of 2.927, 2.743, and 0.712 moles, respectively. Thus, there were produced 45.8, 43.0, and 11.1 moles of $C_8$, $C_{10}$, and $C_{12}$ olefins, respectively, per 100 moles of total $C_8$, $C_{10}$, and $C_{12}$ olefins produced. On the assumption that 1-butene and 1-hexene are equally reactive, the calculated amounts would be 44.5, 44.5, and 11.1 moles of $C_8$, $C_{10}$, and $C_{12}$ olefins, respectively, per 100 moles of total $C_8$, $C_{10}$, and $C_{12}$ olefins produced. A comparison of the 1-butene and 1-hexene conversions, and a comparison of the observed and calculated ratios of the amounts of $C_8$, $C_{10}$, and $C_{12}$ olefins produced, indicate that the olefins are of substantially the same reactivity, being formed in amounts following a predictable statistical distribution. Presumably, minor amounts of dimers and "mixed dimers" resulted from reactions of ethylene derived from the catalyst.

EXAMPLE IV

A stirred mixture of 673 g. (8.0 moles) of 1-hexene, 828 g. (7.38 moles) of 1-octene, 21.2 g. (0.186 mole) of triethylaluminum, and 63.8 g. of cyclohexane was heated at 220° C. for 6 hours in a 1-gallon autoclave. During this period of heating the pressure dropped from 180 p.s.i.g. to 80 p.s.i.g. Gas chromatographic analysis of the reaction mixture showed the conversion of 1-hexene and 1-octene to be 73.8 and 71.9 percent, respectively. The analysis showed $C_{12}$, $C_{14}$, and $C_{16}$ olefins were produced in amounts of 1.439, 2.616, and 1.189 moles, respectively. Thus, there were produced 27.4, 49.8, and 22.7 moles of $C_{12}$, $C_{14}$, and $C_{16}$ olefins, respectively, per 100 moles of total $C_{12}$, $C_{14}$, and $C_{16}$ olefins produced. On the assumption that 1-hexene and 1-octene are equally reactive, the calculated amounts would be 27.1, 49.8, and 23.0 moles of $C_{12}$, $C_{14}$, and $C_{16}$ olefins, respectively, per 100 moles of total $C_{12}$, $C_{14}$, and $C_{16}$ olefins produced. A comparison of the 1-hexene and 1-octene conversions, and a comparison of the observed and calculated ratios of the amounts of $C_{12}$, $C_{14}$, and $C_{16}$ olefins produced, indicate that the olefins are of substantially the same reactivity, being formed in amounts following a predictable statistical distribution. Presumably, minor amounts of dimers and "mixed dimers" resulted from reactions of ethylene derived from the catalyst.

It can be thus seen from Examples I and II that a given feed stream will produce a predetermined statistical mixture of dimerized products, while a stream which is separated into fractions and each fraction separately dimerized is capable of being reblended to produce a mixture of dimerized products of any particular composition lying between the two products. Additionally, it is seen that when a mixture is separated, and each fraction individually dimerized, as in Examples III and IV, the unbranched $C_8$ monomer will not be present in the same reaction mixture as the $C_8$ dimer. There thus will be no problem in separating these two compounds for recycle purposes.

Reasonable variation and modification are possible within the scope of the foregoing disclosure, and the appended claims to the invention, the essence of which is that a mixture of olefins is dimerized by separating the mixture into a plurality of fractions and dimerizing each fraction separately.

We claim:

1. A process for the preparation of detergent alkylate using an olefin feed mixture predominantly comprising $C_4$–$C_8$ normal alpha-olefins which process comprises the steps of:

(a) splitting said olefin feed mixture of $C_4$–$C_8$ normal alpha-olefins into a $C_4$–$C_6$ alpha-olefin fraction and a $C_6$–$C_8$ alpha-olefin fraction, (b) separately dimerizing said $C_4$–$C_6$ alpha-olefin fraction and said $C_6$–$C_8$ alpha-olefin fraction in the presence of an aluminum alkyl dimerization catalyst to produce separate dimerization products comprising $C_8$–$C_{12}$ olefins from said $C_4$–$C_6$ alpha-olefin fraction and $C_{12}$–$C_{16}$ olefins from said $C_6$–$C_8$ alpha-olefin fraction, (c) separating unreacted alpha-olefin from each of said dimerization products,
(d) distilling said $C_8$–$C_{12}$ dimerization product to remove overhead $C_8$–$C_9$ branched olefins and leaving as residue non-volatile aluminum alkyls and recovering a $C_{10}$–$C_{12}$ olefin fraction,
(e) distilling said $C_{12}$–$C_{16}$ dimerization product to remove therefrom as residue non-volatile aluminum alkyls and leaving a fraction predominantly containing $C_{12}$–$C_{16}$ olefins,
(f) combining said $C_{10}$–$C_{12}$ olefin fraction recovered in step (d) and said $C_{12}$–$C_{16}$ fraction recovered in step (e) to obtain a mixture of $C_{10}$–$C_{16}$ olefins, and
(g) subjecting the $C_{10}$–$C_{16}$ olefin fraction obtained in step (f) to reaction with an aromatic hydrocarbon to produce detergent alkylate.

2. A process according to claim 1 wherein the unreacted olefins separated from the separate dimerizations in step (c) are recycled to the respective dimerizations in step (b) and the residues remaining from said distillations in steps (d) and (e) are recycled to the dimerizations in step (b).

References Cited

UNITED STATES PATENTS

| | | | |
|---|---|---|---|
| 2,332,563 | 10/1943 | Egloff | 260—683.15 |
| 2,695,327 | 11/1954 | Ziegler et al. | |
| 2,863,896 | 12/1958 | Johnson. | |
| 3,009,972 | 11/1961 | Johnson. | |
| 3,156,736 | 11/1964 | Southern et al. | |

PAUL M. COUGHLAN, JR., Primary Examiner

U.S. Cl. X.R.

260—683.15